(No Model.)
J. N. KAUFHOLZ.
CAR WHEEL.
No. 296,840. Patented Apr. 15, 1884.
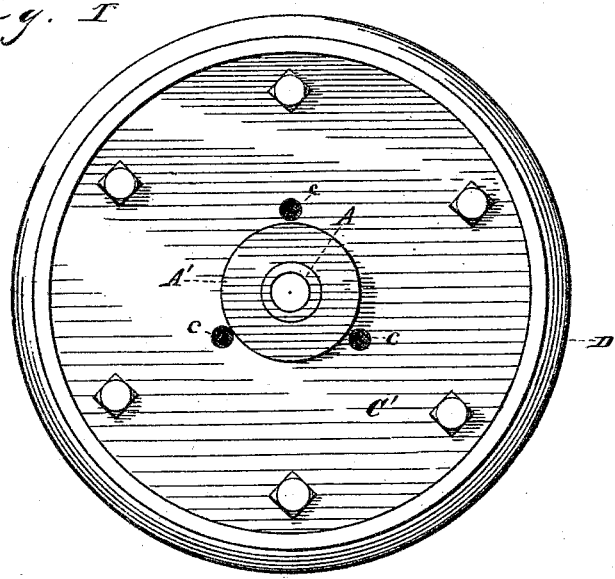
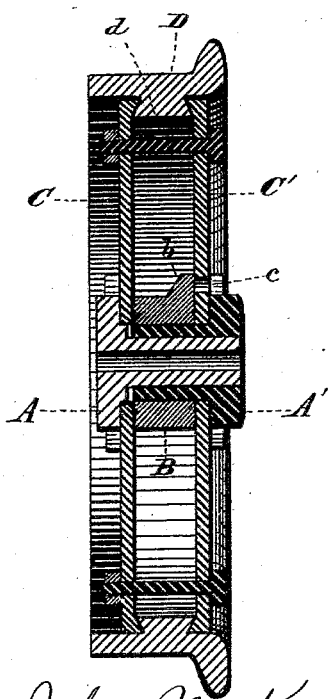
WITNESSES
W. Engel
Geo. W. King
INVENTOR
John N. Kaufholz
By Leggett & Leggett
ATTORNEYS

UNITED STATES PATENT OFFICE.

JOHN N. KAUFHOLZ, OF CLEVELAND, OHIO.

CAR-WHEEL.

SPECIFICATION forming part of Letters Patent No. 296,840, dated April 15, 1884.

Application filed September 7, 1883. (No model.)

*To all whom it may concern:*

Be it known that I, JOHN N. KAUFHOLZ, of Cleveland, in the county of Cuyahoga and State of Ohio, have invented certain new and useful Improvements in Car-Wheels; and I do hereby declare the following to be a full, clear, and exact description of the invention, such as will enable others skilled in the art to which it pertains to make and use the same.

My invention relates to improvements in car-wheels; and it consists in certain features of construction and in combination of parts hereinafter described, and pointed out in the claims.

In the drawings, Figure 1 is an elevation view of the back of my improved car-wheel. Fig. 2 is a cross-section of the same.

The wheel has two hubs, A and A', each provided with an outside flange, and the thimble part of the former extending through and inclosed in the latter, as shown.

B is a thimble separating the disks C and C', and surrounding and fitting a portion of the hub A'. This thimble has three lugs or bosses, $b$, extending radially and equidistant from each other, and the disk C' has holes $c$, respectively opposite the lugs, and through which the said lugs may be operated upon when it is necessary to take the wheel apart.

D is the rim or tire of the wheel, and has an inside rib, $d$, that is beveled on each side and engages tongues on the inside, respectively, of the disks C and C', as shown, and forming a dovetail. This part of the device is held firmly together by bolts extending through the two disks and pressing them with great force against the rib $d$.

In constructing these wheels, first, the disk C' and afterward the thimble B are placed in position on the hub A'. Next, the rim D and the disk $b$ are brought in the position shown and bolted securely, after which the hub A is added. These two hubs are fitted in such a manner that it requires great power to force them together in their proper position, and for this purpose a hydrostatic press is used such as is usually employed to force car-wheels onto their axles. In this manner the respective flanges are forced against the disks, that in turn are pressed against the thimble B, so that the disks are held about as firmly as if they were integral with the hubs. The diameter of the said disks is such that it requires force to press them into their respective seats on the tire, and when in position support the tire as firmly as if the tire and disks were integral with each other; also, the bore of the disks is of such size that it requires force to press them home to their seats on the respective flanges.

There are some marked advantages in this mode of construction, among which are the following: First, the different parts may be made of different kinds of material, each kind adapted to its peculiar use. The rim may be cast without straining it, and may be of hard metal, and if it should crack or break the pieces would be held in their place by the said dovetail. The disks are conveniently made of wrought plates of metal that secure lightness and great strength. The hubs are not liable to break, and may be made of suitable cast metal.

What I claim is—

1. The hubs A and A', so fitted as to require great pressure to bring them properly together, in combination with the thimble B, and adapted to support and firmly hold the disks that support the rim of the wheel, substantially as and for the purpose set forth.

2. The hubs A and A', in combination with the thimble B and the disks C and C', substantially as shown and described.

3. The combination, with the two-part hub and thimble B of the disks C C', secured to the two-part hub in the manner described, each disk being provided with an inwardly-projecting lip, and the rim D, provided with the beveled rib $d$, all of the above parts combined as described.

In testimony whereof I sign this specification, in the presence of two witnesses, this 31st day of August, 1883.

JOHN N. KAUFHOLZ.

Witnesses:
   CHAS. H. DORER,
   GEO. W. KING.